(No Model.)

E. C. CONVERSE.
TUBE COUPLING.

No. 283,974. Patented Aug. 28, 1883.

Witnesses.
J. C. Cooke
A. M. Imbrie.

Inventor.
Edmund C. Converse
by James L. Kay
Attorney

UNITED STATES PATENT OFFICE.

EDMUND C. CONVERSE, OF PITTSBURG, PENNSYLVANIA.

TUBE-COUPLING.

SPECIFICATION forming part of Letters Patent No. 283,974, dated August 28, 1883.

Application filed March 8, 1883. (No model.)

*To all whom it may concern:*

Be it known that I, EDMUND C. CONVERSE, of Pittsburg, in the county of Allegheny and State of Pennsylvania, have invented a new and useful Improvement in Tube-Couplings, (Case D;) and I do hereby declare the following to be a full, clear, and exact description thereof.

My invention relates to the couplings used for connecting thin or light wrought-metal tubing, its object being to provide an efficient coupling for this light-metal tubing, whereby the several lengths of tubing can be connected without cutting into or weakening it, as is the case where the ordinary screw-threaded couplings or sockets are employed.

In Letters Patent granted to me January 10, 1882, June 13, 1882, and September 5, 1882, are shown coupling devices for connecting this tubing; but my present invention relates to another means for connecting this light-metal tubing.

It consists in combining with the coupling collar or sleeve, provided with annular inwardly-flaring calking-recesses at each end, metal tubing, having lugs at or near the ends thereof, and adapted to fit within the collar, so that the tubing will be held within the collar by means of the calking material confined between the lugs on the tubing and the inwardly-flaring sides of the calking-recesses.

It also consists in providing the coupling-collar with an inner central face, within which the ends of the tubing are adapted to meet, and forming the lugs on the tubing the proper distance from the ends thereof, that when the lugs come against the shoulders on either side of this inner face the ends of the two tube-sections connected within the collar will meet within the inner face, so that the inner surface of the tubing, at the joint, will be smooth or flush, and friction of the fluid in passing through the coupling will be prevented.

To enable others skilled in the art to make and use my invention, I will describe same more fully, referring for that purpose to the accompanying drawings, in which—

Figure 1:
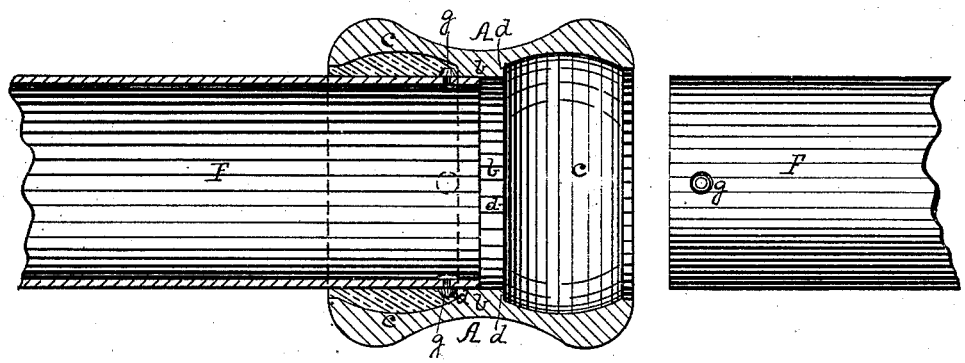
Figure 2:
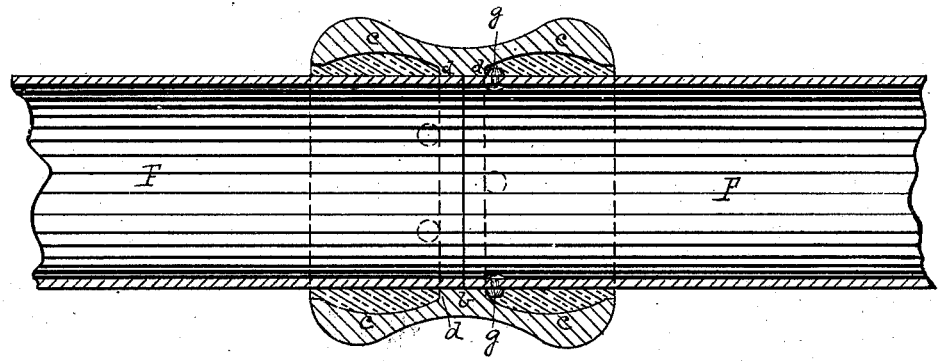

Figure 1 is a longitudinal section of the coupling-collar, showing one tube-section connected therein and the other tube-section in full lines, ready to enter the collar; and Fig. 2 is a longitudinal section of the coupling-collar and tubing connected therein, illustrating the meeting of the tube-sections within the inner face of the collar.

Like letters of reference indicate like parts in each.

In the drawings, A represents the coupling-collar employed by me, this collar being preferably cast to shape, though it may be rolled or forged and turned, if desired. It may be provided with an inner central ring and inner faces on either side thereof, as shown in the Letters Patent before referred to; but the construction preferred by me is illustrated in the drawings, in which the collar is provided with the inner central face, $b$, corresponding in diameter to the exterior diameter of the tubing to be connected, within which inner face the ends of the two tube-sections are adapted to meet. On either side of this inner central ring, $b$, are the annular inwardly-flaring calking-recesses $c$, and at the base of these calking-recesses, on either side of the ring $b$, are formed the shoulders $d$, against which lugs on the tubing are adapted to fit or bear, as hereinafter described. The tubing to be connected within the coupling-collar is what is termed "light-metal tubing," being formed of thin wrought metal, and being too light to receive the ordinary screw-threads employed to connect the usual thickness of wrought-metal tubing. Each tube-section F is provided with the lugs $g$ at or near the ends thereof, these lugs being formed on the tubing at such a distance from the ends thereof that when they fit against the shoulder $d$ in the coupling-collar the end of the tubing will extend to the center of the inner face, $b$, of the collar, and the tube-section will thus be prevented from entering the coupling-collar farther than to bring the end thereof to the center of the inner face. Thus the two tube-sections connected within the collar will meet in the center of the inner face, $b$, and form a smooth inner surface to the tubing at the joint, and will prevent friction of the fluid passing through the tubing, so that less power is required to force it through the line of tubing. The lugs on the tubing may be secured thereto by riveting or welding, or may be expanded from the body of the tube, neither method injuriously affecting the tubing, as the calking material fills the calking-recesses above the lugs, and prevents leakage in case there is any imperfection at the lugs. The lugs are preferably riveted on the tubing, as shown, thus not requiring the reheating of the tubing.

In connecting tubing by my improved coupling or sleeve the ends of the tubing are entered within the coupling-collar until they come against the central ring, in case it is employed, or until the lugs on the tubing come against the shoulder $d$ on either side of the inner central face, $b$, where the coupling-collar shown in the drawings is employed. In this coupling-collar the ends of the tube then meet and form a smooth and flush inner surface to the tubing at the joint. The melted lead or other calking material is then poured into the annular inwardly-flaring calking-recesses $c$, and is calked or solidified in the usual manner, and the coupling is made. The calking material thus fills the annular calking-recesses, and, by means of the large body of calking material confined between the lugs and the inwardly-flaring sides of the annular calking recesses, holds the tubing within the coupling-collar, and thus forms a secure connection between the different lengths of tubing, the tubing being by this means held against longitudinal or drawing strain consequent to the contraction or expansion of the tubing at different temperatures. As the lugs are below the calking material and protected by it, and the body of the tubing is not weakened at or near the ends thereof, there is no more liability of injury to it from lateral or bending strain at the coupling than in the body of the tubing.

The tube-coupling thus formed does not require the turning of the tubing or collar to form a locking-connection, as the tube is locked within the collar by means of the calking material confined between the lugs and the inwardly-flaring sides of the calking-recesses. The coupling thus formed is comparatively inexpensive, and forms a secure connection for this light-metal tubing against all strains without the weakening of the tubing, and provides a joint which is smooth and flush on the inner surface, thus overcoming friction of the fluid in passing through it.

What I claim as my invention, and desire to secure by Letters Patent, is—

1. In couplings for tubing, the combination, with a coupling collar or sleeve provided with annular inwardly-flaring calking-recesses at each end, of metal tubing having lugs or projections at or near the ends thereof, and adapted to fit within the collar, and to be held therein by means of calking material confined between the lugs and inwardly-flaring sides of the collar-recesses, substantially as set forth.

2. In couplings for tubing, the combination, with the coupling collar or sleeve, having the inner central face, $b$, shoulders $d$ on both sides thereof, and annular inwardly-flaring calking-recesses at each end, of the metal tubing having the lugs $g$, adapted to fit against the shoulders $d$ and cause the tubing to meet within the inner central face of the collar, substantially as and for the purposes set forth.

In testimony whereof I, the said EDMUND C. CONVERSE, have hereunto set my hand.

EDMUND C. CONVERSE.

Witnesses:
  CHAS. C. DORR,
  WM. L. HURD.